Aug. 19, 1941.   E. S. YOUNG   2,253,412
DISCONNECTING ROLLER BEARING
Filed March 12, 1941
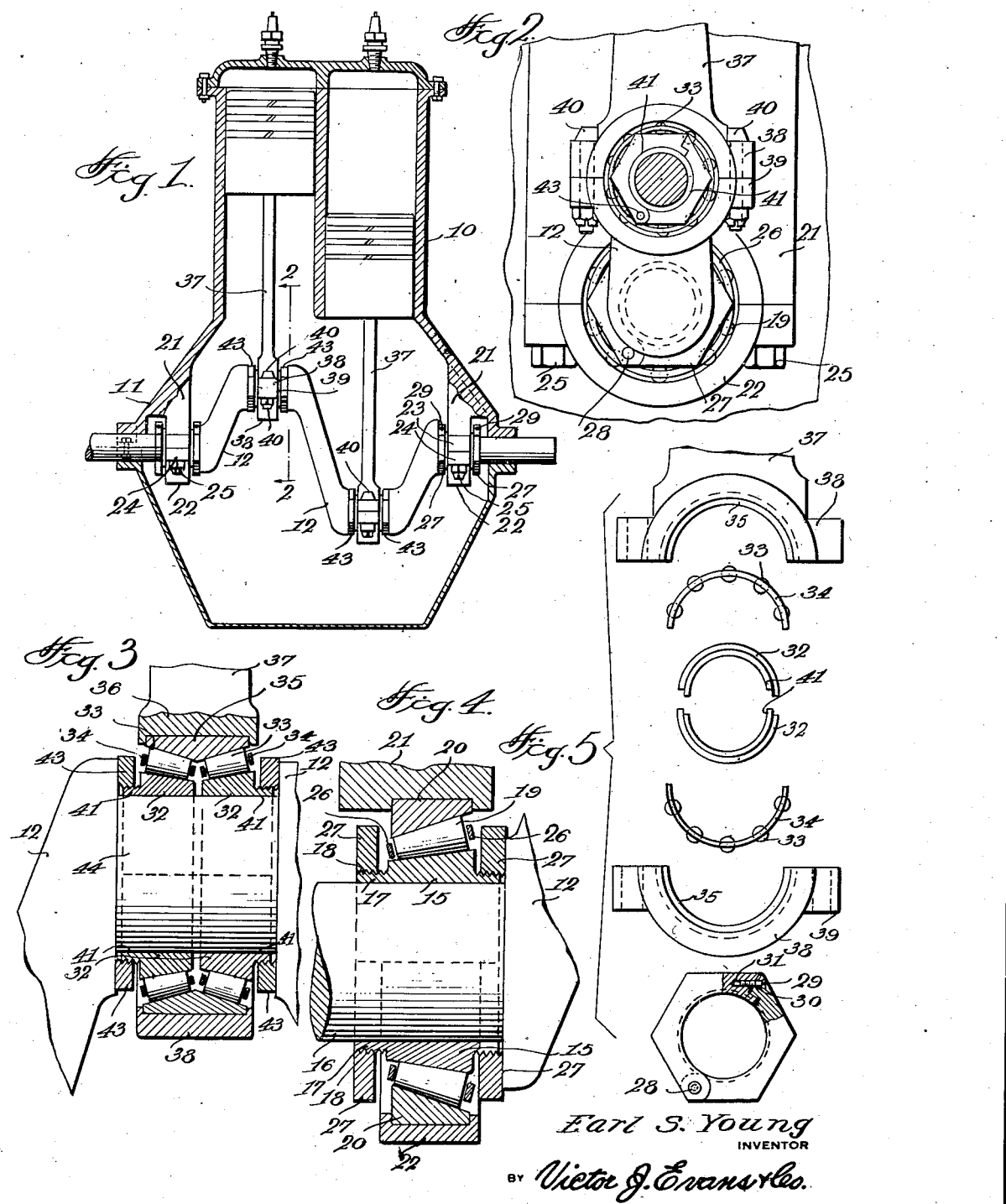
Earl S. Young
INVENTOR
BY Victor J. Evans & Co.
ATTORNEYS
WITNESS Patented Aug. 19, 1941

2,253,412

UNITED STATES PATENT OFFICE 2,253,412

DISCONNECTING ROLLER BEARING

Earl S. Young, San Antonio, Tex.

Application March 12, 1941, Serial No. 383,008

2 Claims. (Cl. 308—207)

This invention relates to a disconnecting roller bearing.

Crank shafts with double throw cranks, that is, cranks supplied with arms at both sides of the wrist pin, are difficult to fit with roller bearings. It is an object of the present invention to provide a roller bearing having an inner race which is bored to fit the wrist pin and which is of sectional formation to adapt it to be easily applied.

Taking up wear on roller bearings has been usually difficult and does not always maintain proper alignment of the cranks, connecting rods and the like. It is a further object of this invention to provide means for easily taking up wear on the bearing and at the same time preserving proper alignment of the parts.

A further object is to provide a device of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal sectional view of an internal combustion motor having the main bearings and the wrist pin bearings of the crank shaft constructed in accordance with the invention.

Figure 2 is an enlarged longitudinal sectional view taken on the line 2—2 of Figure 1.

Figure 3 is a cross sectional view of one of the wrist pin bearings.

Figure 4 is a cross sectional view of one of the main bearings.

Figure 5 is a diagrammatic view showing the different parts of the bearing shown in Figure 3.

Referring now to the drawing in which like characters of reference designate similar parts in the various views, 10 designates an internal combustion motor having a plurality of cylinders, and a crank case 11 having openings through the ends thereof, through which the crank shaft 12 is adapted to extend.

The main shaft bearings, constructed in accordance with this invention, each include an inside tapered race formed of two semi-circular sections 15 which are adapted to be placed astride of the journal 16 of the crank shaft, at one end of the shaft. The sections are provided at the lateral sides thereof with respective semi-circular extensions 17 which are of the same inner diameter as the sections themselves and which are provided with external screw threads 18.

Roller bearings 19 are confined between the sections of the inside race and semi-circular sections 20 of an outside race, one of which is seated in the main box bearing 21 fixed to the crank case, and the other of which is seated in the cap 22 of the bearing, the main bearing and cap having respective flanges 23 and 24 which are bolted together, as shown at 25 in Figure 1.

The roller bearings 19 are carried by respective semi-circular carrier bars 26 disposed at the ends of the bearings.

Nuts, each formed of two semi-circular sections 27, hinged together as shown at 28 in Figure 5, are mounted on the threaded extension 17, and one of the nuts bears against the adjacent crank 12. This latter nut may be advanced against the crank arm to thread the inside tapered race 15 away from the crank and thus take up wear on the inside race and outside race when necessary. The sections of the nut are held in closed position by a screw 29 advanced through an opening 30 in one of the sections and into an opening 31 in the other section, as best shown in Figure 5.

The wrist pin bearing of the crank, constructed in accordance with the invention, is identical with the main bearing, just described, with the exception that there are two sectional inside tapered races, each formed of companion semi-circular sections 32. Respective tapered roller bearings 33 are mounted on the inside tapered races 32, the roller bearings being formed of semi-circular sections, the roller bearings of each semi-circular section being connected at the ends by carrier bars 34.

A single outer race formed of semi-circular sections 35 having two relatively inclined tapered faces to receive the roller bearings 33, are mounted in a bearing box 36 which is integral with the crank shaft 37 and in a cap 38, the bearing and cap being provided with respective flanges 38 and 39, which are bolted together as shown at 40 in Figure 1.

The semi-circular sections 32 of the two inner races are provided with extensions 41 of the same inner diameter as the sections of the races, and which are externally threaded, as shown at 42, to receive nuts 43, each of which is identical with the nut 17 previously described, that is, it is formed of sections hingedly connected together at one end and connected together at the other end by a screw, as shown in Figure 5. Both nuts bear against the two cranks 12 on opposite sides of the wrist pin 44. The nuts may be advanced against the crank arms to thread the sections 32 of the inside tapered race toward each other to take up wear.

From the above description it is thought that the construction and operation of the invention will be fully understood without further explanation.

What is claimed is

1. In a crank shaft bearing, the combination of an outside tapered race, an inside tapered race, roller bearing assemblies between the races, both races and the roller bearing assemblies being of arcuate sectional formation to adapt them to be easily applied to a crank shaft, a box bearing and a cap therefor receiving the outer race, arcuate extensions on the outer lateral sides of the sections of the inside race adapted to snugly fit the shaft, said extensions being externally screw-threaded, and nuts each formed of sections removably connected together and threaded on to the extensions to secure the inside sections of the inside race in assembled relation, one of said nuts being adapted to be rotated against a portion of said shaft as an abutment for moving the sections of the inside race longitudinally of the shaft to take up wear.

2. In a crank shaft bearing, the combination of an outside tapered race having oppositely inclined inner faces and formed of arcuate sections, a pair of laterally spaced tapered inside races formed of arcuate sections adapted to snugly fit a crank shaft, laterally spaced roller bearing assemblies disposed between respective inside races and respective inclined inner faces of the outside race, said inside races being formed of arcuate sections, a box bearing and a cap therefor receiving the outside race, arcuate extensions on the outer lateral sides of both inside races adapted snugly to fit the shaft, said extensions being externally screw-threaded, nuts on the extensions adapted to secure the sections of the inside races in assembled relation, said nuts being adapted to be rotated against a portion of said shaft as an abutment to advance the races longitudinally of the shaft to take up wear.

EARL S. YOUNG.